G. W. LEWIS.
DOLLY SHAFT BEARING FOR WASHING MACHINES.
APPLICATION FILED SEPT. 23, 1912.
1,113,452.
Patented Oct. 13, 1914.
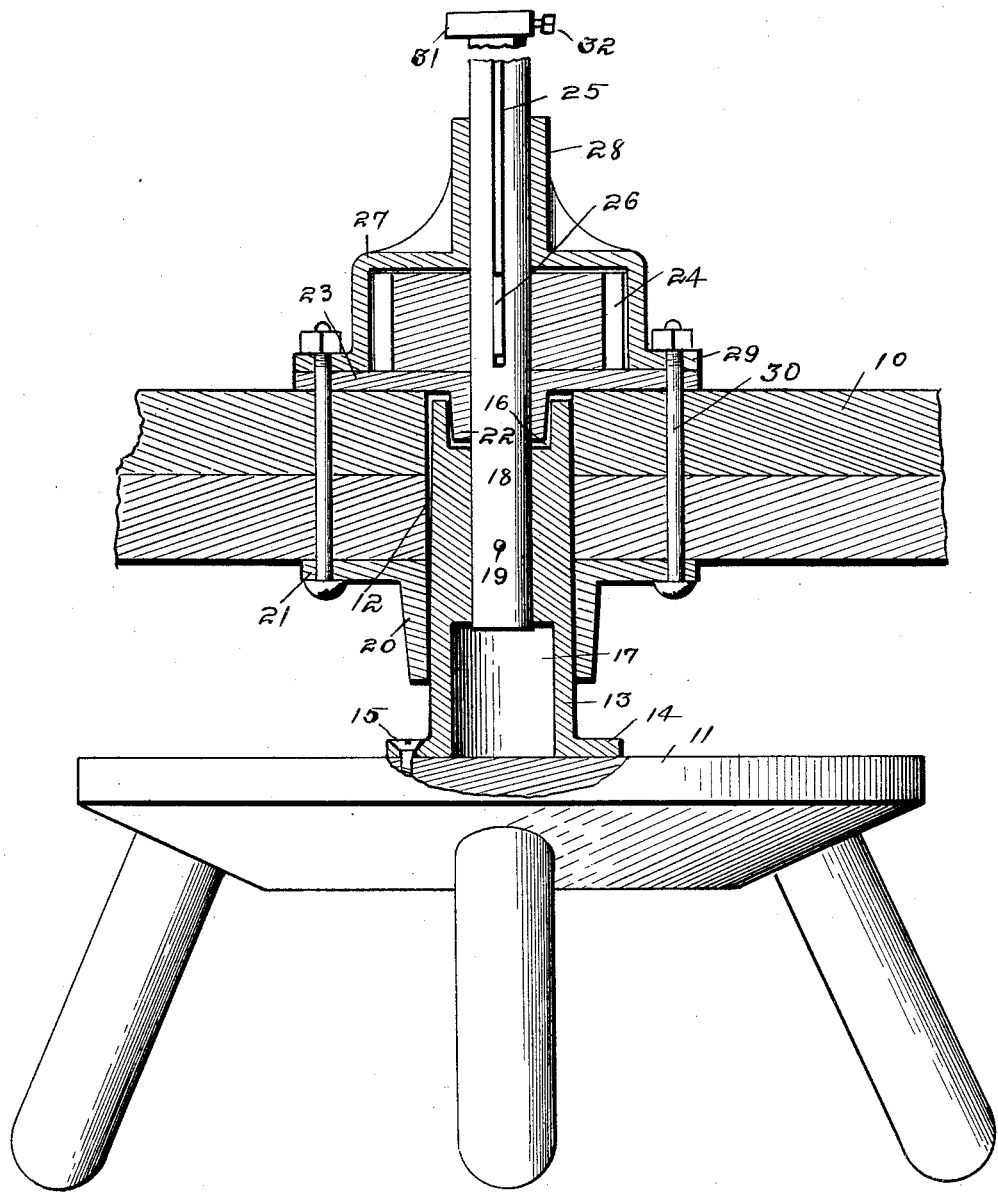
WITNESSES:
INVENTOR.
ATTORNEYS.

UNITED STATES PATENT OFFICE.

GEORGE W. LEWIS, OF GRINNELL, IOWA.

DOLLY-SHAFT BEARING FOR WASHING-MACHINES.

1,113,452. Specification of Letters Patent. Patented Oct. 13, 1914.

Application filed September 23, 1912. Serial No. 721,969.

*To all whom it may concern:*

Be it known that I, GEORGE W. LEWIS, a citizen of the United States, residing at Grinnell, in the county of Poweshiek and State of Iowa, have invented a certain new and useful Dolly-Shaft Bearing for Washing-Machines, of which the following is a specification.

The object of my invention is to provide an improved dolly shaft bearing for washing machines including means for mounting the same so that little or none of the oil on the dolly shaft can get into the interior of the tub and to the clothes.

A further object is to provide such a dolly shaft bearing so mounted that the dolly shaft is capable of vertical sliding movement for adjusting the dolly to the position of the clothes in the tub while maintaining the shaft in proper relation with its operating gear.

More particularly it is my object to provide in a washing machine of the dolly type, a dolly shaft with a dolly mounted thereon, means for mounting the shaft in a hinged cover to permit vertical movement of the shaft with relation to the contents of the tub, and at the same time to permit the oiling of the shaft and its suitable bearings and to afford protection to the shaft so that neither the oil nor the oiled parts can come into contact with the contents of the tub in any of the positions of the shaft.

My invention consists in certain details in the construction, arrangement and combination of the various parts of the device, whereby the objects contemplated are attained, as hereinafter set forth, pointed out in my claims and illustrated in the accompanying drawings in which the figure shows a side view of a dolly and dolly shaft, the shaft and means for mounting same being shown in central, vertical section.

In the accompanying drawings I have used the reference numeral 10 to indicate the cover of the washing machine in which the dolly shaft is mounted. Below the cover 10 is a dolly 11 of ordinary construction. The cover is provided with a central vertical opening 12 to receive the dolly shaft, and the mechanism whereby the same is mounted. Secured to the upper surface of the dolly is a mounting or bushing 13 having at its lower end a circumferential annular flange 14 whereby said bushing is secured to the dolly by means of screws 15 or the like. In its upper end the bushing 13 is provided with a socket 16 preferably cylindrical in form. In the lower end of the bushing 13 I preferably form a large opening 17 to reduce the weight of the mounting. Between the opening 17 and the socket 16 is a vertical opening designed to receive the dolly shaft 18 which may be secured to the bushing 13 by means of a pin 19 or other suitable device.

Secured to the lower surface of the cover 10 is a protecting sleeve 20 for the bushing 13 and provided with a circumferential annular flange 21 designed to rest against the lower surface of the cover 10 which is shown made in two parts, and may be of ordinary construction. On top of the cover 10 is a bearing sleeve 22 which is provided with a central opening forming a bearing for the shaft 18, and with a circumferential annular flange 23 for securing said sleeve to the cover of the tub. The sleeve 22 extends downwardly into the socket 16 thereby forming a bearing within the socket for the bushing 13 when the shaft is at its uppermost position. The construction of the sleeve 22 and the socket 16 serves the purpose of preventing the passage of oil or grease from the shaft 18 into the interior of the tub.

Slidably but non-rotatably mounted on the shaft 18 above the sleeve 22 is a gear wheel 24. The upper portion of the shaft 18 is provided with a vertical slot 25 in which is received a key 26 on the gear 24. Partially inclosing the gear 24 is a gear casing 27 having an upward extension 28 forming a vertical bearing for the shaft 18. The gear casing 27 is provided at its lower edge with an outward extending horizontal flange 29 designed to rest upon the flange 23. The sleeves 20 and 22 and the gear casing 27 are mounted on the cover 10 by means of bolts 30 extending through the flanges 21, 23 and 29 and through the members of the cover 10.

On the shaft 18 above the extension 28 is a collar 31 which may be adjustably secured on the shaft 18 by means of a thumb screw 32. It will be seen that the downward movement of the shaft 18 is limited by the collar 31 which engages the upper end of the extension 28.

In the practical operation of my improved dolly, the shaft 18 is vertically slidable in the gear 24 and the bushing 13 and the dolly slides vertically with the shaft. It will be understood that said sliding movement is limited by the key 26 in the slot 25 so that the upper end of the mounting 13 never moves to the lower end of the sleeve 20. The dolly is permitted to move vertically and freely at all times to accommodate itself to the position or quantity of clothes in the tub. Oil or grease on the gear 24 or on the shaft 18 will not under any ordinary circumstances be admitted to the interior of the tub. Only a small amount of oil or grease will travel down the shaft 18 from the gear 24 through the sleeve 22 and such oil will be retained in the socket 16. The shaft 18 fits the opening in the bushing 13 so closely that oil will not pass through said bushing.

I claim as my invention:

1. In a device of the class described, a support having an opening therein, a bearing at one end of said opening, a shaft slidably and rotatably mounted therein, a gear on said shaft, a casing for said gear having a second bearing for said shaft, a downwardly extending flange around the lower end of the opening in said support, a supporting bushing secured to the lower end of said shaft, provided with a cup at its upper end and capable of longitudinal movement in said opening, and means for limiting the movement of said shaft so that the cup of said bushing and surface of said shaft will not be exposed to material being worked upon beneath said support.

2. In a device of the class described, a support provided with an opening, a bearing at one end of said opening, a shaft slidably and rotatably mounted in said bearing, an annular flange around the other end of said opening, a supporting bushing on the other end of said shaft, capable of longitudinal movement in said bearing, and means for limiting the longitudinal movement of said shaft and bushing so that the upper end of said bushing will not extend below the lower edge of said annular flange, for the purposes stated.

3. In a device of the class described, a support provided with an opening, a bearing at the upper end of said opening, an annular flange at the lower end of said opening to lengthen it, a shaft slidably and rotatably mounted in said bearing, said shaft being provided with an enlarged portion at its lower end, said enlarged portion being slightly smaller in diameter than said opening and capable of longitudinal movement therein, and means for limiting the downward movement of said shaft so that the upper end of said enlarged portion will not extend below the lower edge of said sleeve to prevent the bearing portion of the shaft coming in contact with material worked upon beneath said support.

Des Moines, Iowa, September 14, 1912.

GEORGE W. LEWIS.

Witnesses:
 J. T. CESSUA,
 F. P. MARVIN.

---

Copies of this patent may be obtained for five cents each, by addressing the "Commissioner of Patents, Washington, D. C."